United States Patent
Schade et al.

(10) Patent No.: US 11,981,082 B2
(45) Date of Patent: May 14, 2024

(54) DEVICE AND METHOD FOR THE GENERATIVE PRODUCTION OF A THREE-DIMENSIONAL OBJECT

(71) Applicant: EOS GmbH Electro Optical Systems, Krailling (DE)

(72) Inventors: Martin Schade, Munich (DE); Robert Achim Domröse, Germering (DE); Martin Leuterer, Olching (DE); Michael Göth, Munich (DE); Maximilian Mittermüller, Munich (DE); Markus Kuchenbaur, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 39 days.

(21) Appl. No.: 16/605,837

(22) PCT Filed: Mar. 29, 2018

(86) PCT No.: PCT/EP2018/058228
§ 371 (c)(1),
(2) Date: Oct. 17, 2019

(87) PCT Pub. No.: WO2018/192763
PCT Pub. Date: Oct. 25, 2018

(65) Prior Publication Data
US 2021/0122117 A1 Apr. 29, 2021

(30) Foreign Application Priority Data
Apr. 21, 2017 (DE) ...................... 10 2017 206 792.6

(51) Int. Cl.
*B29C 64/371* (2017.01)
*B22F 10/28* (2021.01)
(Continued)

(52) U.S. Cl.
CPC ............ *B29C 64/371* (2017.08); *B22F 10/28* (2021.01); *B22F 10/322* (2021.01);
(Continued)

(58) Field of Classification Search
CPC ... B29C 64/371; B29C 64/153; B29C 64/393; B33Y 10/00; B33Y 50/02
See application file for complete search history.

(56) References Cited

U.S. PATENT DOCUMENTS

| | | |
|---|---|---|
| 2009/0266803 A1 | 10/2009 | Perret et al. |
| 2016/0001401 A1 | 1/2016 | Dimter et al. |

(Continued)

FOREIGN PATENT DOCUMENTS

| | | |
|---|---|---|
| CN | 101321600 | 12/2008 |
| CN | 105102160 | 11/2015 |

(Continued)

OTHER PUBLICATIONS

International Search Report for Application No. PCT/EP2018/058228, dated Jul. 4, 2018, 2 pages.

*Primary Examiner* — Larry W Thrower
(74) *Attorney, Agent, or Firm* — Polsinelli

(57) ABSTRACT

A control method serves for controlling at least one solidification device of an additive manufacturing device for manufacturing a three-dimensional object by means of an additive layer build method in which at least one object is manufactured by repeated application of a layer of a building material to a build area and by selective solidification of the applied layer at positions corresponding to a cross-section of the object to be manufactured, wherein a gas having a plurality of flow directions which essentially are not aligned in the same direction flows across the build area. The method includes receiving and/or determining a distribution of the flow directions of the gas above the build area, (Continued)

assigning a reference flow direction to an area of the build area in dependence on the distribution of the flow directions above the area, controlling the solidification device to solidify at least a part of the cross-section of the object to be produced in dependence on a reference flow direction above the area of the build area in which the respective part of the cross-section is positioned.

25 Claims, 6 Drawing Sheets

(51) Int. Cl.
  *B22F 10/322* (2021.01)
  *B29C 64/153* (2017.01)
  *B29C 64/393* (2017.01)
  *B22F 10/366* (2021.01)
  *B22F 10/80* (2021.01)
  *B22F 12/70* (2021.01)
  *B22F 12/90* (2021.01)
  *B33Y 10/00* (2015.01)
  *B33Y 50/02* (2015.01)
(52) U.S. Cl.
  CPC .......... *B29C 64/153* (2017.08); *B29C 64/393* (2017.08); *B22F 10/366* (2021.01); *B22F 10/80* (2021.01); *B22F 12/70* (2021.01); *B22F 12/90* (2021.01); *B33Y 10/00* (2014.12); *B33Y 50/02* (2014.12)

(56) References Cited

U.S. PATENT DOCUMENTS

| | | | |
|---|---|---|---|
| 2016/0114531 | A1 | 4/2016 | Chuang et al. |
| 2016/0136731 | A1 | 5/2016 | McMurtry et al. |
| 2016/0144531 | A1 | 5/2016 | Hermescec |
| 2016/0279706 | A1 | 9/2016 | Domrose et al. |
| 2016/0361873 | A1 | 12/2016 | Maier |
| 2017/0072468 | A1 | 3/2017 | Schilling et al. |
| 2017/0136696 | A1 | 5/2017 | Jakimov et al. |
| 2017/0282463 | A1 | 10/2017 | Schilling et al. |
| 2018/0065081 | A1 | 3/2018 | Herzog et al. |

FOREIGN PATENT DOCUMENTS

| | | |
|---|---|---|
| CN | 105451970 | 3/2016 |
| CN | 107789909 | 3/2018 |
| DE | 2013205724 | 10/2014 |
| DE | 102014209161 | 11/2015 |
| DE | 102014212100 | 12/2015 |
| DE | 102014217786 | 3/2016 |
| EP | 2786858 | 8/2014 |
| EP | 3050666 | 8/2016 |
| WO | 2014125258 | 8/2014 |

Fig. 2
a)
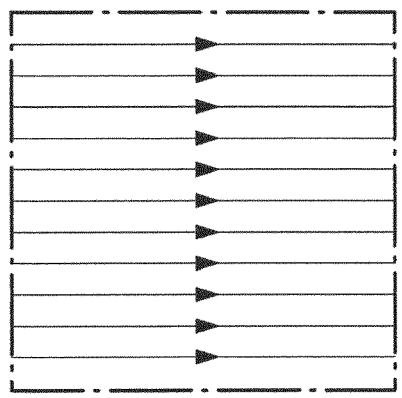
b)
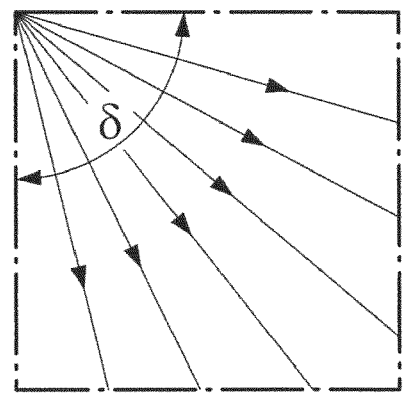
c)
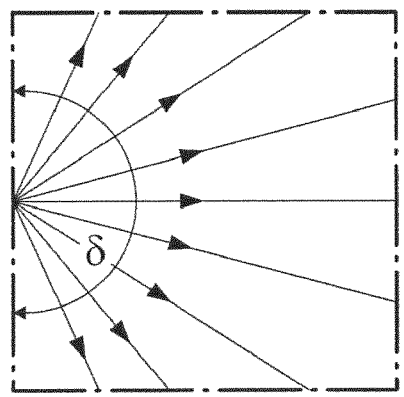
d)
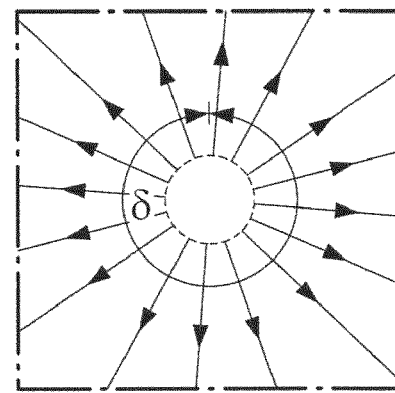
e)
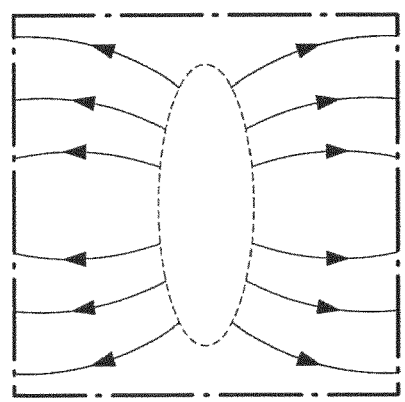
f)
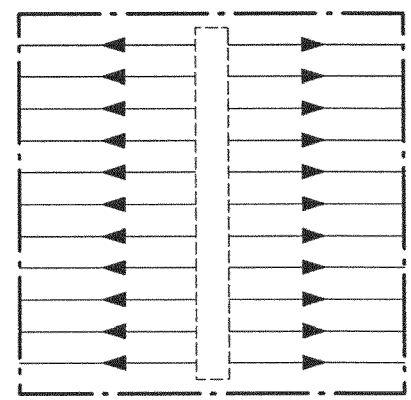

Fig. 4
a)
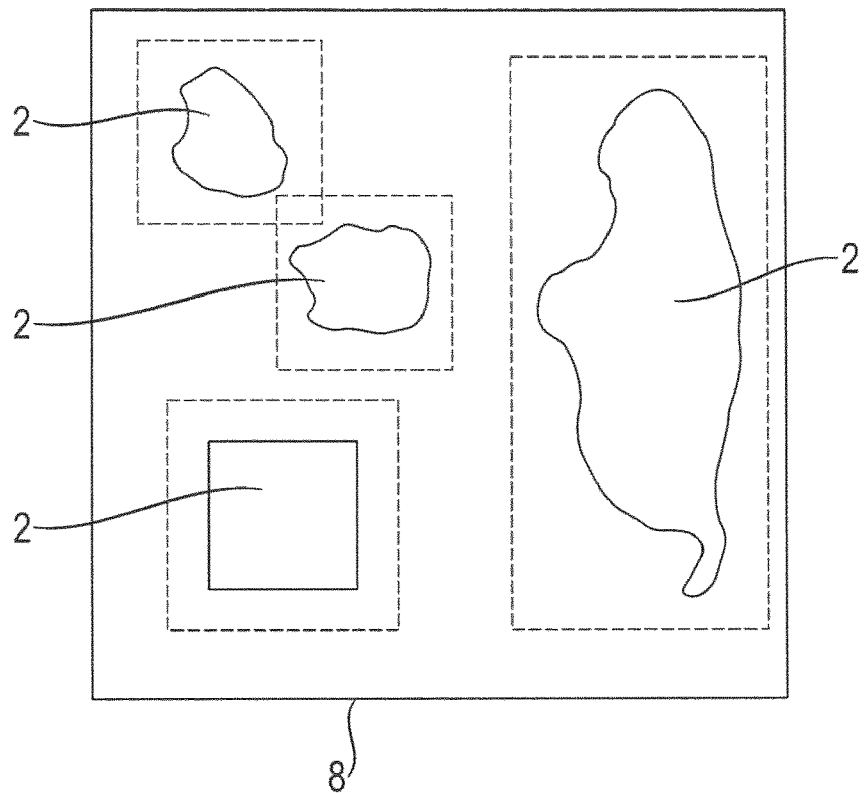
b)
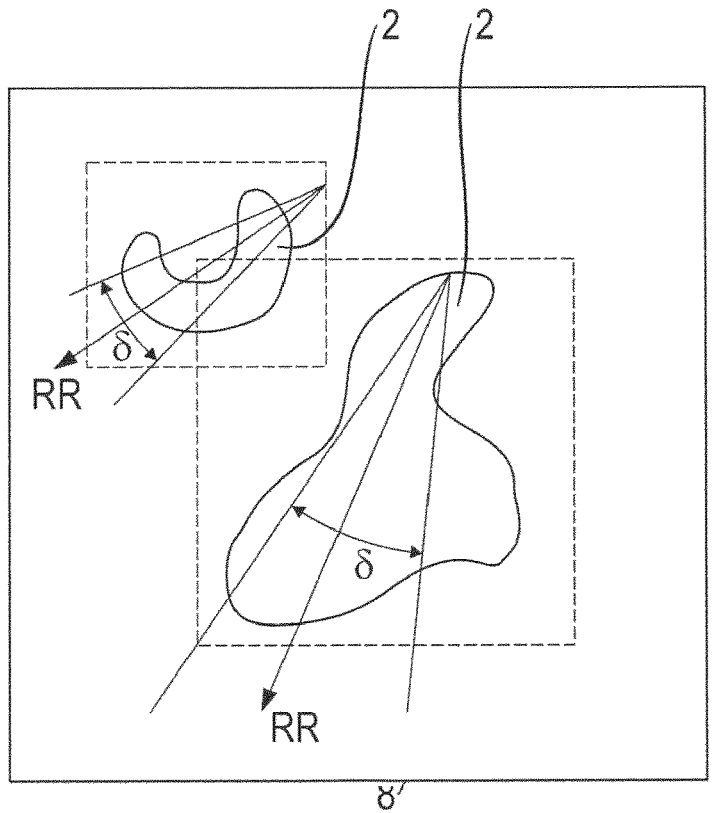

Fig. 5
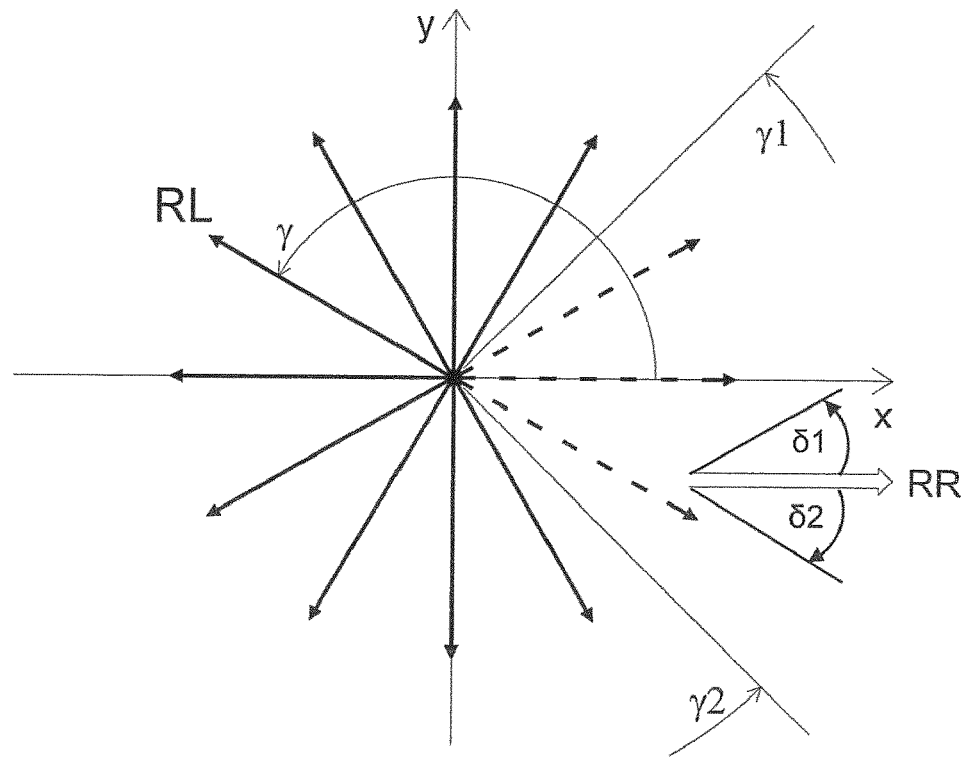
Fig. 6   a)   b)
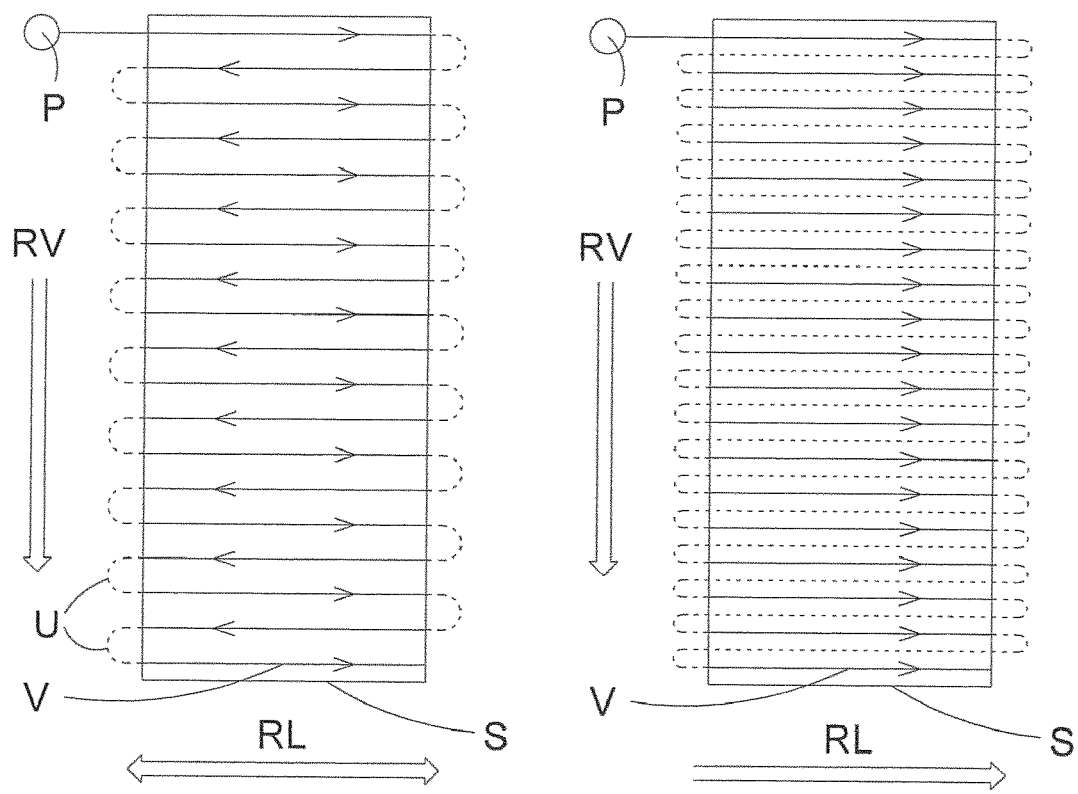

US 11,981,082 B2

DEVICE AND METHOD FOR THE GENERATIVE PRODUCTION OF A THREE-DIMENSIONAL OBJECT

TECHNICAL FIELD OF THE INVENTION

The present invention relates to a device and to a method for the additive manufacturing of a three-dimensional object by applying and selectively solidifying a building material, preferably a powder, layer by layer.

BACKGROUND OF THE INVENTION

Such methods are used for example for rapid prototyping, rapid tooling and additive manufacturing. One example of such a method is known by the name "selective laser sintering or laser melting". Thereby, a thin layer of the powdery building material is repeatedly applied, and the building material in each layer is selectively solidified by a selective irradiation of positions corresponding to a cross-section of the object to be manufactured with a laser beam.

During the irradiation with the laser beam, depending on the type of the material used, in particular when sintering or melting metals, splashes, fumes and vapors are produced which expand into the build space. In order to remove them from the building chamber, a gas flow may be directed through the building chamber.

DE 10 2013 205 724 A1 describes a device and a method for laser sintering or melting, wherein during the scanning of an applied powder layer by the laser beam, a gas flow having a main flow direction is directed across the applied layer. In order to prevent the impurities from entering the optical path of the laser beam and impairing the quality of the manufactured object due to a disturbance of the laser beam, the main flow direction of the gas flow and the scanning direction of the laser beam are adapted to each other. This means that the scanning direction of the laser beam is selected in dependence on the main flow direction of the gas flow, or vice versa, so that the angle between the two directions satisfies a predetermined angular relationship.

SUMMARY OF THE INVENTION

The object of the present invention is to provide an alternative or improved method or device for the additive manufacturing of a three-dimensional object by layerwise application and selective solidification of a building material, in which a gas flow is passed across an applied layer of the building material, in particular when the gas flows across the layer in different flow directions.

This objective is achieved by a control method according to claim 1, a manufacturing method according to claim 12, a computer program according to claim 13, a control device according to claim 14, and a manufacturing device according to claim 15. Further developments of the invention are indicated in the dependent claims, respectively. The methods may also be further developed by the features of the devices described below or in the dependent claims, or vice versa. The features of the devices and methods may also be used for a mutual further development.

The control method according to the invention serves for controlling at least one solidification device of an additive manufacturing device for manufacturing a three-dimensional object by means of an additive layer build method in which at least one object is manufactured by repeated application of a layer of a building material, preferably a powder, to a build area and by selective solidification of the applied layer at positions corresponding to a cross-section of the object to be manufactured, wherein a gas having a plurality of flow directions which essentially are not aligned in the same direction flows across the build area. The method comprises, for at least one layer to be solidified, the steps of receiving and/or determining a distribution of the flow directions of the gas above the build area, assigning a reference flow direction to an area of the build area depending on the distribution of the flow directions above the area, controlling the solidification device to solidify at least a part of the cross-section of the object to be produced in dependence on a reference flow direction above the area of the build area in which the respective part of the cross-section is positioned.

Such a control method makes it possible, for example, to control the solidification process in such a way that the solidification is not affected by impurities such as splashes, fumes and/or vapors arising during the solidification process. This allows, for example, a higher manufacturing precision and a more homogeneous quality of objects or workpieces to be achieved, and under certain circumstances also an improvement of their structural and mechanical properties. The process offers particular advantages for complex flow guidances over the build area with clearly different flow directions, e.g. with flows running separately over the build area or with overlapping, diverging or converging partial flows of an overall flow.

Flows which pass unguided along a certain distance are often not completely controllable with regard to their direction. In the process chamber of an additive manufacturing device, gas flows can be deflected at least temporarily, for example by moving elements such as a recoater or by temperature differences. This can, for example, lead to a wobbling or instationary behavior of the gas flow during the production of a three-dimensional object. This can be taken into account by means of a tolerance range: A gas flow which nominally has a single flow direction (which also includes the case of several partial gas flows running in parallel to each other) can, in practice, assume local deviations of, for example, 10° relative to the nominal flow direction without significantly impairing the production process.

In contrast, flow directions "essentially not aligned in the same direction" are understood to mean that partial flows have different flow directions in a purposeful manner. This effect can be achieved by a suitable design and/or control of elements of a gas supply and/or gas discharge into or out of the process chamber. Preferably, an angle between the designed flow directions of partial gas flows is at least 20°, and particularly preferred at least 40°.

"Receiving a distribution of the flow directions of the gas above the build area" means taking it over from a device in which the flow distribution is stored and/or calculated, for example by simulating the flow course. The device may in principle be part of an additive manufacturing device and/or a control device for such a manufacturing device, or it may be an independent, separate unit. Receiving may be done as transmission of data of the flow directions in a suitable data format or through a suitable interface or by operator input, e.g. at an input interface. The storage or simulation can be performed with several degrees of fineness, i.e. with different local resolutions across the two-dimensional extension of the build area or across the three-dimensional space above the build area.

"Determining" is to be understood here as a measurement-technical detection of the flow distribution, for example by means of sensors. The degree of fineness of the measurement can be determined by a number of the sensors used and thus by their respective distance from each other or by a density of their distribution across the area of the build area. The sensors are preferably arranged in the working plane or in a plane which runs in parallel to the working plane at a predetermined height.

A "distribution of the flow directions of the gas" in this context means a representation or interpretation or filtered representation of the actual flow directions of a gas flow in an examined area of the process chamber. The distribution can be regular or irregular, a density of the distribution can be different, e.g. locally selectively vary. The flow directions can be defined three-dimensionally or two-dimensionally. For example, it may be sufficient to determine only the horizontal components of flow directions or flow vectors, i.e. directions in a plane parallel to the build area, within the framework of a certain interest in knowledge. Alternatively, flow directions can also be defined by horizontal and vertical components (for a horizontally oriented build area). The distribution of the flow directions can be static or dynamic. The procedure according to the invention can be carried out once or several times and can be used, for example, to calibrate components of an additive manufacturing device.

The wording "above the build area" is here to be understood as meaning that a point at which a flow direction is determined lies within the build area when it is projected in an orthogonal projection onto the plane of the build area. Typically, the location has a maximum distance to the build area, which is defined by a clear height of the process chamber. With regard to a function of the gas flow to displace smoke and to discharge it from an area of the process chamber above the build area, the flow directions can be determined at one or more heights above the build area, e.g. in several planes parallel to the build area or in a three-dimensional matrix. With regard to an effect of the gas flow on an applied powder layer as an example for a method of an additive layer building method, it may be advantageous to determine the flow directions at a low height above the build area of, for example, 1 or 5 cm. In this way, an unfavourable influence on the applied layer can be better detected.

The "reference flow direction" assigned to an area can correspond to a single flow direction, for example if a given distribution of flow directions is relatively coarse or if there is actually a uniform flow profile above the area in question. Preferably, the distribution of the flow directions is provided in a resolution that allows a reference flow direction to comprise at least two flow directions of the distribution respectively. Reference flow directions are preferably assigned in such a way that the flow directions included in each case deviate from each other to a relatively small extent. For example, the reference flow direction may be an average value of the flow directions encompassed by it, whereby the flow directions may be weighted equally or differently.

The wording "assigning a reference flow direction . . . in dependence" includes the case where the reference flow direction to be assigned to an area is set to a zero value. This may be caused, for example, by the fact that due to very different, possibly opposing flow directions above the area, assigning a single reference flow direction to the area does not make sense because it would represent too broad a spectrum of flow directions. Typically, the reference flow direction is defined by a certain angle relative to the build area, which can refer to an orientation in the surface or in space.

The wording "controlling the solidification device . . . in dependence" includes the case where the solidification device is controlled in such a way that it does not solidify. Typically, certain parameter values of the solidification device are set during control. For example, if a certain area of the build area is not to be solidified, one of these parameters can be set to a zero value so that the area is omitted from solidification.

Preferably, the control method further comprises the steps: dividing at least one section of the build area into several sub-areas, and assigning a reference flow direction to the sub-area for more than one sub-area of the build area. Preferably, the sub-areas are selected adjacent to one another and/or overlapping one another and/or the division into sub-areas is performed in dependence on a geometry of the object to be manufactured in the respective layer and/or the division into sub-areas is performed in dependence on a distribution of the flow directions above the build area. Thereby, for example, the control method according to the invention may be applied to locally limited areas in the case of a strong divergence of the flow directions.

Preferably, in the control method, the solidification device for solidifying at least a part of the cross-section of the object to be manufactured, which extends across more than one of the sub-areas, is further controlled in dependence on the respective reference flow direction above the respective sub-area. Thereby, for example, the solidification of the object to be manufactured can be adapted to different flow directions prevailing above the sub-areas.

Preferably, the division into sub-areas is performed in dependence on a divergence angle of the flow directions, wherein preferably an area of a sub-area is selected the larger the smaller the divergence angle is and the smaller the larger the divergence angle is. Thereby, for example, the divergence of the flow directions per sub-area can be limited. In principle, the divergence angle of the flow directions in all spatial directions can serve as a basis for the division. The divergence angle of flow directions that are essentially parallel to the build area in one plane is preferably used, i.e. any vertical component of the flow directions that may be present is not taken into account for division. This configuration of the invention is particularly advantageous in the case of a flow characteristic essentially parallel to the build area, as it is frequently implemented in additive layer manufacturing devices.

Preferably, the reference flow direction is an average flow direction of a number of flow directions, and the division into sub-areas is performed in such a way that a deviation of a flow direction above a sub-area from the reference flow direction above the sub-area does not exceed a predetermined angle. Thereby, for example, a reference flow direction can be easily determined for the sub-area. Depending on the selection or setting of the angle, the influence of impurities on the properties of the finished product or object can be reduced.

Preferably, the division into sub-areas within a layer is performed locally selectively, more preferably by limiting a deviation of the flow directions above the sub-areas from the respective reference flow direction above the sub-areas by different predetermined angles. Thereby, for example, the division into sub-areas can be flexibly adapted to the locally prevailing flow conditions. The angles, which limit the deviation, can be determined depending on quality criteria for the object or areas of the object to be produced. For example, the higher the requirement for homogeneity of the object or object area, the lower the angle may be selected.

Preferably, the predetermined angle is at least 0°, preferably at least 1°, particularly preferably at least 5° and/or at most 60°, preferably at most 30°, particularly preferably at most 20°. Thereby, for example, it can be achieved that a deviation of a flow direction from the reference flow direction lies within a predetermined range.

Preferably, the division into sub-areas is performed layer-specifically in dependence on a geometry of a cross-section of the object to be manufactured which is to be solidified respectively and/or of a ratio of area contents of an area to be solidified and of an area of the build area which is not to be solidified and/or of a degree of fragmentation of the area to be solidified within a respective layer. Thereby, for example, the division into sub-areas can be carried out depending on the component.

Preferably, assigning a reference flow direction to an area or sub-area is performed in dependence on a distribution of the flow directions in a flow segment above the area or sub-area, wherein more preferably the flow segment is a two-dimensional area segment with a predetermined distance to the build area and/or a three-dimensional space segment with a predetermined distance to the build area and a predetermined height. Thereby, for example, a direct assignment of the reference flow direction of an area or solidification segment of the build area to a two- or three-dimensional flow distribution in the assigned flow segment can be realized. For example, flow segments and solidification segments can be graphically displayed and superimposed in order to make any critical zones of the solidification of a layer or object cross-section visible.

Preferably, a reference flow direction exclusively represents flow directions from the received or determined distribution which lie in a defined angular spectrum and/or flow directions which correlate with a respective partial gas flow the volume flow value of which lies above a predefined threshold value. Thereby for example an influence of the reference flow direction by smaller disturbances like e.g. local turbulences can be prevented. This is based on the knowledge that turbulences with a low volume flow can move smoky process emissions such as residues to a comparatively small extent and can therefore be neglected when determining a direction of consolidation in an area of the build area below the respective turbulence.

Preferably, the step of controlling comprises defining a solidification direction for the areal and/or at least those sub-areas of the build area in which the cross-section of the object to be manufactured is positioned, wherein preferably an angle between a solidification direction and a reference flow direction is at least 22.5°, preferably at least 45°, more preferably at least 60°, even more preferably at least 90° and/or at most 337.5°, preferably at most 315°, more preferably at most 300°, even more preferably at most 270°. Thereby, for example, the direction of solidification can be selected in such a way that it differs sufficiently from the direction of propagation of the impurities formed during solidification.

Preferably, the solidification device of the control method according to the invention is an irradiation device and the direction of solidification is a direction of the movement of an impact point of a solidification beam, especially preferably a laser beam, across the build area.

According to a further development of the invention, in the control method the respective flow direction is preferably measured and/or simulated in a computer based on at least one of the following criteria: a given geometry of a gas supply and/or discharge device for supplying or discharging gas to or from a process chamber of the additive manufacturing device, a given geometry of an interior of the process chamber, a projection of a geometry of a nozzle of the gas supply device on the build area, a velocity and/or a density and/or a pressure and/or a temperature of the gas supplied to the process chamber and/or a change in the velocity and/or the density and/or the pressure and/or the temperature of the gas while it flows through the process chamber. Thereby, for example, a particularly precise determination of the distribution of flow directions over the build area can be achieved.

Preferably, the control method includes at least the steps: detecting a number of flow directions of the gas above the build area by means of a preferably anemometric detection device, comparing the detected flow directions with locally and/or temporally corresponding flow directions simulated in a computer, determining a correction factor based on the comparison of the detected and simulated flow directions, and performing a simulation of the distribution of the flow directions of the gas above the build area, taking into account the determined correction factor. Thereby, for example, a continuous improvement of a simulation of a distribution of the flow directions over the build area can be achieved.

Preferably a component of a vector of a flow direction of the gas flow which is vertical relative to the build area is determined and taken into account in the assignment of a reference flow direction to an area or sub-area and/or in the division into sub-areas, wherein particularly preferably no reference flow direction is assigned to an area or sub-area if the flow direction(s) above the area or sub-area is/are substantially vertical to the build area. The consideration of the vertical component can be done, for example, as a correction factor with which a horizontal component of a flow vector can be multiplied and/or with which a weighting of the flow vector relative to other flow vectors of the flow distribution can be changed. This may result, for example, in advantages for flow profiles with a relatively high proportion of gas partial flows impinging obliquely and/or vertically onto the build area. In this case, an isolated consideration of horizontal components of flow vectors could distort the actual influence of a flow or partial flow on a manufacturing process. In this respect, this implementation of the invention can lead to an improved quality of the solidification process.

According to a further implementation of the invention, data for assigning a reference flow direction to an area or sub-area and/or for dividing into sub-areas are preferably stored in a database for a predetermined setting of a flow of the process chamber, more preferably for a predetermined course of a gas flow and/or for a predetermined effective range of the flow, these data being particularly preferably used and/or modified and used for an actual assignment of a reference flow direction to an area or sub-area and for dividing an area of the build area into sub-areas. Thereby, for example, a quick adaptation of the solidification device to a change in the flow profile of the process chamber or the distribution of the flow directions across the build area can be achieved. Since the data for assigning and/or dividing can be retrieved or stored at any time prior to an actual manufacturing process, computing capacity can also be saved during the manufacturing process.

The manufacturing method according to the invention serves for the additive manufacturing of a three-dimensional object by layerwise application and selective solidification of a building material, preferably a powder. The manufacturing method comprises the steps: applying a layer of the building material to a build area, selectively solidifying the applied layer of the building material at locations corresponding to a cross-section of the object to be manufactured by means of a solidifying device, and repeating the steps of applying and solidifying until the three-dimensional object is finished. Therein, a gas having a plurality of flow directions which essentially are not aligned in the same direction flows across the build area. A control method according to the invention is used to perform the manufacturing method, preferably wherein the control method according to the invention is performed only before a start of the selective solidification or several times during the additive manufacturing of the three-dimensional object and/or is performed depending on an adjustment and/or a change of the flow directions of the gas. Such a manufacturing process makes it possible, for example, to achieve the effects of the control method according to the invention in the manufacturing of a three-dimensional object.

The computer program according to the invention is loadable into a programmable control unit and comprises program code means for executing all the steps of a control method according to the invention and/or a manufacturing method according to the invention when the computer program is executed on the control unit. Such a computer program makes it possible, for example, to achieve the effects of the control or manufacturing process according to the invention by computer control.

The control device according to the invention for a manufacturing device for additive manufacturing a three-dimensional object by layerwise application and selective solidification of a building material in a build area, wherein the manufacturing device comprises: a solidification device for selectively solidifying a layer of said building material applied to a build area at locations corresponding to a cross-section of the object to be manufactured, and a flow device for generating a gas flow having a plurality of flow directions which essentially are not aligned in the same direction across the build area, wherein the control device is adapted to control the manufacturing device in such a way that it performs a control method according to the invention. Such a control device makes it possible, for example, to control the manufacturing device for the additive manufacturing of a three-dimensional object in such a way that the effects of the control or manufacturing process in accordance with the invention are achieved.

The manufacturing device according to the invention serves for the additive manufacturing of a three-dimensional object by layerwise application and selective solidification of a building material, The manufacturing device comprises a solidification device for selectively solidifying a layer of said building material applied to a build area at locations corresponding to a cross-section of the object to be fabricated, and a flow device for generating a gas flow having a plurality of flow directions which essentially are not aligned in the same direction across the build area. The manufacturing device is adapted and/or controlled to repeat the steps of applying and selectively solidifying until the object is completed, and comprises a control device according to the invention. With such a manufacturing device, for example, the effects of the control or manufacturing method according to the invention can be achieved.

BRIEF DESCRIPTION OF THE DRAWINGS

Further characteristics and functionalities of the invention result from the description of exemplary embodiments with reference to the attached figures.

FIGS. 2a to 2f show, as examples, various plan views of a build area to illustrate various alternatives of how gas may flow over a build area of the device shown in FIG. 1.

FIGS. 4a and 4b show in plan views of the build area two examples of an object-dependent segmentation of the build area.

FIG. 5 shows a plan view of the build area to illustrate an exposure method according to the first embodiment.

FIGS. 6a and 6b show in plan views of the build area two examples of scanning sequences of a stripe to be solidified by a laser beam according to a second embodiment of the present invention.

DETAILED DESCRIPTION OF THE EMBODIMENTS

Figure 1:
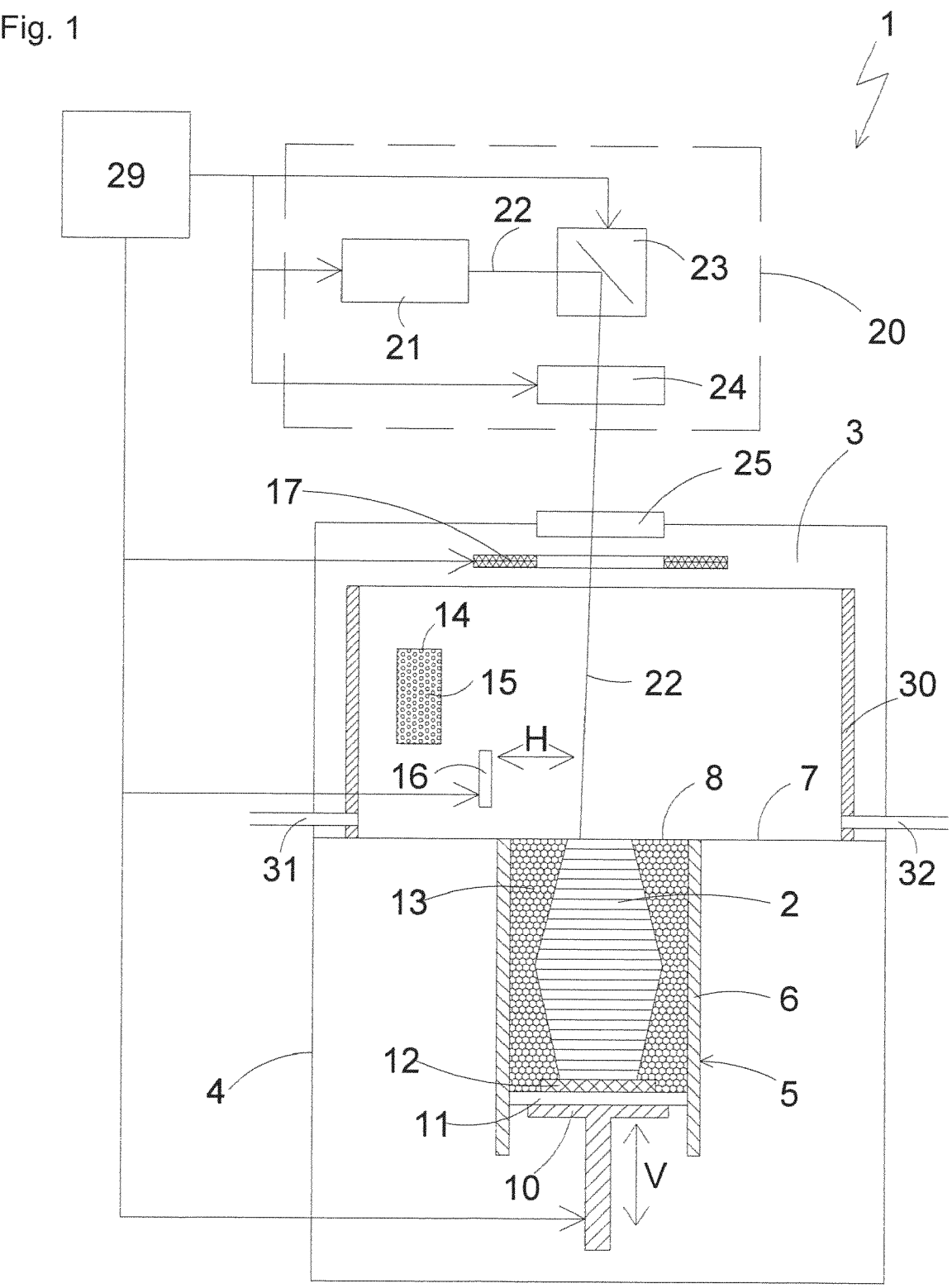
FIG. 1 is a schematic view, partially shown in section, of a device for the additive manufacturing of a three-dimensional object according to a first embodiment the present invention.

A first embodiment of the present invention will be described below with reference to FIG. 1. The device illustrated in FIG. 1 is a laser sintering or laser melting device 1. For building the object 2, the device 1 includes a processing chamber 3 having a chamber wall 4.

A container 5, which is open at the top and which has a container wall 6, is arranged in the processing chamber 3. The upper border of the container 5 defines a working plane 7, wherein the portion of the working plane 7 lying within the opening at the top that can be used for building the object 2 is referred to as a build area 8.

A support 10, which is movable in a vertical direction V and onto which a base plate 11 is attached which closes the container 5 toward the bottom and thus forms the base of the latter, is disposed in the container 5. The base plate 11 may be a plate which is formed separately from the support 10 and which is attached to the support 10, or it may be formed so as to be integral with the support 10. Depending on the powder and process used, a building platform 12 on which the object 2 is built may also be attached as a building base to the base plate 11. However, the object 2 may also be built on the base plate 11 which then itself serves as the building base. In FIG. 1, the object 2 which is to be formed in the container 5 on the building platform 12 is illustrated below the working plane 7 in an intermediate state, having a plurality of solidified layers and being surrounded by building material 13 remaining unsolidified.

The laser sintering device 1 further comprises a storage container 14 for a pulverulent building material 15 which is can be solidified by an electromagnetic radiation, and an application device 16, which is movable in a horizontal direction H, for applying the building material 15 within the build area 8. Preferably, the application device 16 extends over the entire area to be applied in a direction traverse to its movement direction.

Optionally, a radiation heater 17 for heating the applied building material 15 is arranged in the processing chamber 3. An infrared lamp may for example be provided as the radiation heater 17.

The laser sintering device 1 further comprises an irradiation device 20 having a laser 21 which generates a laser beam 22 which is deflected by way of a deflecting device 23 and which is focused by way of a focusing device 24 via a coupling window 25 provided at the top of the processing chamber 3 in the chamber wall 4 onto the working plane 7. As an alternative, the irradiation device 20 may also be formed to simultaneously direct a plurality of laser beams 22 serving as solidifying beams through one or plural coupling windows 25 to the working plane 7

The laser sintering device 1 further comprises a control unit 29 by way of which the individual component parts of the device 1 are controlled in a coordinated manner for carrying out the building process. As an alternative, the control unit may partially or entirely be arranged outside of the device. The control unit may include a CPU, the operation of which is controlled by a computer program (software). The computer program may be stored on a storage medium separate from the device, from where it may be loaded into the device, especially into the control unit.

Furthermore, the laser sintering device 1 contains a flow device 30 with a gas supply 31 and a gas discharge 32 for generating a gas flow across the build area. This version of a flow device 30 can, for example, generate a directional gas flow with essentially a single flow direction across the build area 8 as shown schematically in FIG. 2a. Alternatively or additionally, the flow device 30 may have a gas supply on the ceiling of process chamber 3 (not shown) which directs a gas flow into the process chamber 3 or to the build area 8, which may for example be shaped by a nozzle. Such a design can, for example, generate flow patterns across the build area 8 as shown in FIGS. 2d, 2e, 2f.

In operation, the support 10 first is lowered by a predetermined height corresponding to the desired layer thickness for applying a powder layer. The application device 16 is first moved to the storage container 14 from which it receives an amount of building material 15 which is sufficient for applying a layer. Then, it moves across the build area 8 where it applies a thin layer of the pulverulent building material 15 onto the building base or a previously applied powder layer, and pulls it apart to form a powder layer. The application is carried out at least across the entire cross-section of the object 2 to be produced, preferably across the entire build area 8, i.e. the area delimited by the container wall 6. Optionally, the pulverulent building material 15 is heated by means of the radiation heater 17 to a working temperature.

Subsequently, the cross section of the object 2 to be produced is scanned by the laser beam 22 with a predetermined pattern such that the pulverulent building material 15 is solidified at the locations corresponding to the cross section of the object 2 to be produced. Therein, the powder grains at those locations are partially or entirely melted by the energy introduced by the radiation so that after cooling, they are agglutinated to each other to form a solid body. While the powder layer is being scanned by the laser beam, a gas flow is guided over the build area 8 by means of the flow device 30. These steps are repeated until the object has been finished and can be removed from the processing chamber 3.

Depending on the design and/or arrangement and/or control of one or more inlets or outlets which are used for gas supply or gas discharge into or out of process chamber 3, different flow distributions can be realized in the flow device 30. If the inlets and outlets for gas supply and gas discharge are arranged at a small distance above the level of the build area, as shown in FIG. 1, an essentially horizontal gas flow can be generated across the build area from one side to the other. The distribution of the gas inlets and outlets around the build area influences the flow distribution of the gas flow over the build area.

FIGS. 2a to 2c show examples of plan views of a build area to illustrate various alternatives for how gas can flow essentially horizontally over the build area during scanning.

FIG. 2a schematically shows a flow distribution as it forms the basis of the DE 10 2013 205 724 A1 mentioned above. For its generation, a gas inlet extending over the entire width of the build area is arranged on one side of the build area (in the figure on the left) and a gas outlet also extending over the entire width of the build area is arranged on the opposite side of the build area (in the figure on the right). With suitable control, a flow that is essentially directed in the same direction across the entire build area results with flow lines running parallel to one another, which in FIG. 2a symbolize the partial gas flows flowing essentially parallel to one another in the same direction.

FIG. 2b schematically shows a flow distribution which results when a gas inlet selectively supplies gas from a corner of the process chamber 3 (in the figure at the top on the left). The partial gas flows of this fan flow can optionally be discharged at the two sides opposite the corner (in the figure on the right and at the bottom) of build area 8 by one gas outlet each extending over the entire width of the build area. The flow lines or flow directions of the partial gas flows are divergent and form an angle to each other. The maximum angle between the flow lines in a plan view is called the divergence angle δ. In this example it is δ=90°.

FIG. 2c schematically shows a flow distribution that results when a gas inlet selectively supplies gas in the center of one side (in the figure on the left). The gas partial flows of this fan flow can optionally be discharged at the other three sides (in the figure at the top, at the right and at the bottom) by one gas outlet each extending over the entire width of the build area. The flow lines diverge again, the divergence angle is δ=180°.

In addition to or as an alternative to the arrangement of gas inlets at the level of the build area or at a distance above the build area, one or more gas inlets can also be arranged above the build area in order to generate a gas flow which essentially vertically impinges on the build area. This gas flow is deflected after impact and then flows off via the build area to gas outlets arranged on its sides.

FIGS. 2d to 2f show examples of views of a build area to illustrate various alternatives, such as gas which essentially impinges vertically on the build area (e.g. at an angle of 80° to 90° to the build area) during scanning and can flow across the build area to gas outlets arranged on its sides.

FIG. 2d schematically shows a flow distribution which results when gas is supplied from above essentially perpendicular to the build area in such a way that it impinges on the build area in an essentially circular impact area (shown dashed in the figure) and flows off there radially to all sides to gas outlets arranged there. Here all flow directions are represented in one plane parallel to the build area, the divergence angle is δ=360°.

FIG. 2e schematically shows a flow distribution which results when gas is supplied from above essentially perpendicularly to the build area in such a way that it impinges on the build area in an elongated, for example oval or elliptical impact area (shown dashed in the figure) and is discharged there to two opposite sides to gas outlets arranged there.

FIG. 2f schematically shows a flow distribution which results when gas is supplied from above, e.g. through a gas inlet in the process chamber ceiling, substantially perpendicularly to the build area in such a way that an impact area of the gas flow on the build area has the shape of a narrow rectangle (shown dashed in the figure) and it is discharged there to two opposite sides to gas outlets arranged there.

Such flow distributions can also be changed in the course of the process, for example by switching inlets or outlets between gas supply operation, gas discharge operation and idle state and/or by moving nozzles at the inlets or outlets. This generally allows the realization of variable or fixed flow directions which can be actively or passively influenced, e.g. by aligning an effective area of an injection or extraction and/or obstruction or temporary interruption of a flow, for example by elements of the application and/or flow device or other components moving across and/or resting above the build area.

The present invention refers to flow distributions such as those shown in FIGS. 2b to 2f. However, it is not limited to this, but can be applied to all flow distributions in which gas with several flow directions, which are essentially not aligned, flows across the build area.

According to a configuration of the invention, the manufacturing process is controlled in such a way that a direction of solidification, in this case the direction in which the laser beam travels over the applied powder layer, is selected for at least a part of the cross-section of the object to be manufactured (i.e. for a solidification segment) in dependence on a flow distribution in an area above the respective solidification segment (i.e. in a flow segment).

In order to learn the flow distribution respectively prevailing in the process chamber, the first step is to receive and/or determine a distribution of the flow directions of the gas above the build area, in particular essentially directly adjacent to the build area.

Receive means the transfer from a device in which the flow distribution corresponding to the geometry of one or more used inlets, outlets or nozzles of the flow device, the pressure used and/or the gas flow rate used is stored and/or calculated, for example by simulating the flow path. The simulation can be carried out with several degrees of fineness, which means with different local resolutions area the two-dimensional extension of the build area or area the three-dimensional space above the build area.

The simulation can preferably be performed based on at least one of the following criteria:
a given geometry of a gas supply and/or discharge device for supplying or discharging gas to or from a process chamber of the additive manufacturing device,
a given geometry of an interior of the process chamber,
a projection of a geometry of a nozzle of the gas supply device on the build area,
a velocity and/or a density and/or a pressure and/or a temperature of the gas supplied to the process chamber and/or a change in the velocity and/or the density and/or the pressure and/or the temperature of the gas while it flows through the process chamber.

Determine means the measurement of the flow distribution by means of sensors such as anemometers, for example thermal anemometers. The degree of fineness of the measurement is determined by the number of sensors used and thus by their respective distance from each other or a density of their distribution area the area of the build area. The sensors are preferably arranged in the working plane or in a plane which runs parallel to the working plane at a predetermined height above it. The measurement can also be made at several heights above the working plane, for example at 0, 5 and 10 mm heights.

Measurement and simulation can also be combined, for example by the following procedure:
Detecting a number of flow directions of the gas above the build area by means of a preferably optical detection device (e.g. by optical detection of the movement of smoke clouds during the building process),
Comparing the detected flow directions with locally and/or temporally corresponding flow directions simulated in a computer,
Determining a correction factor based on the comparison of the detected and simulated flow directions, and
Performing a simulation of the distribution of the flow directions of the gas above the build area, taking into account the determined correction factor.

The next step is to assign a reference flow direction to at least one area of the build area. The reference flow direction is a flow direction that is selected so that it approximates the flow distribution above the area under consideration. It is needed for controlling the movement of the laser beam across the build area, as described below.

Preferably, a reference flow direction is assigned to an area depending on a received and/or determined distribution of the flow directions in a flow segment that lies above the area. Therein, the flow segment is preferably a two-dimensional area segment with a predetermined distance to the build area and/or a three-dimensional space segment with a predetermined distance to the build area and a predetermined height, wherein the predetermined distance to the build area can in each case also be zero.

Therein, the reference flow direction is preferably calculated from the received and/or determined distribution of the flow directions in the flow segment by means of a data processing device. The reference flow direction can, for example, be calculated as an arithmetic mean of the flow directions in the area or only as an arithmetic mean of the horizontal components of previously received or determined flow vectors. Forming an arithmetic mean proves to be particularly advantageous when the distribution of flow directions is collected in a sufficiently fine and uniform manner across the flow segment or build area. The reference flow direction can also be calculated in such a way that a maximum angular deviation of the flow directions in the area from the reference flow direction in both directions is the same, i.e. equal to half the divergence angle, respectively.

Preferably a reference flow direction represents exclusively flow directions from the received or determined distribution which lie in a defined angular spectrum and/or flow directions which correlate with a respective partial gas flow whose volume flow value lies above a predefined threshold value.

For a small divergence angle of the flow distribution, the area to which a reference flow direction is assigned may extend over the entire build area or, for example, over the entire section of the build area corresponding to a cross-section of the object to be produced.

For larger divergence angles of the flow distribution, the build area or the section of the build area corresponding to a cross-section of the object to be produced can be divided (segmented) into sub-areas or segments, and to each of these sub-areas of the build area, an own reference flow direction is then assigned.

Preferably, dividing the build area into sub-areas (segmentation) is carried out in dependence on a distribution of the flow directions above the build area, in a further preferred way on a divergence angle of the flow directions. In a further preferred way, the smaller the divergence angle, the larger the area of a sub-area is selected, and the larger the divergence angle, the smaller the area of the sub-area is selected.

Dividing into sub-areas is preferably carried out in such a way that the divergence angle above the sub-area does not exceed a predetermined angle, or in other words that a deviation of a flow direction above a sub-area from an average flow direction does not exceed a predetermined angle on either side. For example, the arithmetic mean of the flow directions in the area can be selected as the mean flow direction. Alternatively, it is also possible to select the direction for which an angular deviation of the flow directions from the mean flow direction in both directions is the same within the sub-area. The predetermined angle is at least 0°, preferably at least 1°, particularly preferred at least 5° and/or at most 60°, preferably at most 30°, particularly preferred at most 20°.

Preferably, the sub-areas are selected to be adjacent to one another and/or to overlap one another and/or the division into sub-areas is carried out in dependence on a geometry of the object to be produced in the respective layer and/or the division into sub-areas is carried out locally selectively within a layer, further preferably in such a way in that a deviation of the flow directions above the sub-areas from a respective mean flow direction above the sub-areas is limited by different predetermined angles.

The division into sub-areas can also be carried out layer-specifically depending on a geometry of a cross-section to be solidified of the object to be produced and/or on an area ratio between an area to be solidified and an area of the build area not to be solidified and/or on a degree of fragmentation of the area to be solidified within a respective layer.

With a flow distribution such as that shown in FIG. 2f, for example, the build area can be divided into a left and a right area in which the flow is essentially in the same direction: to the left in the left area and to the right in the right area.

Figure 3:
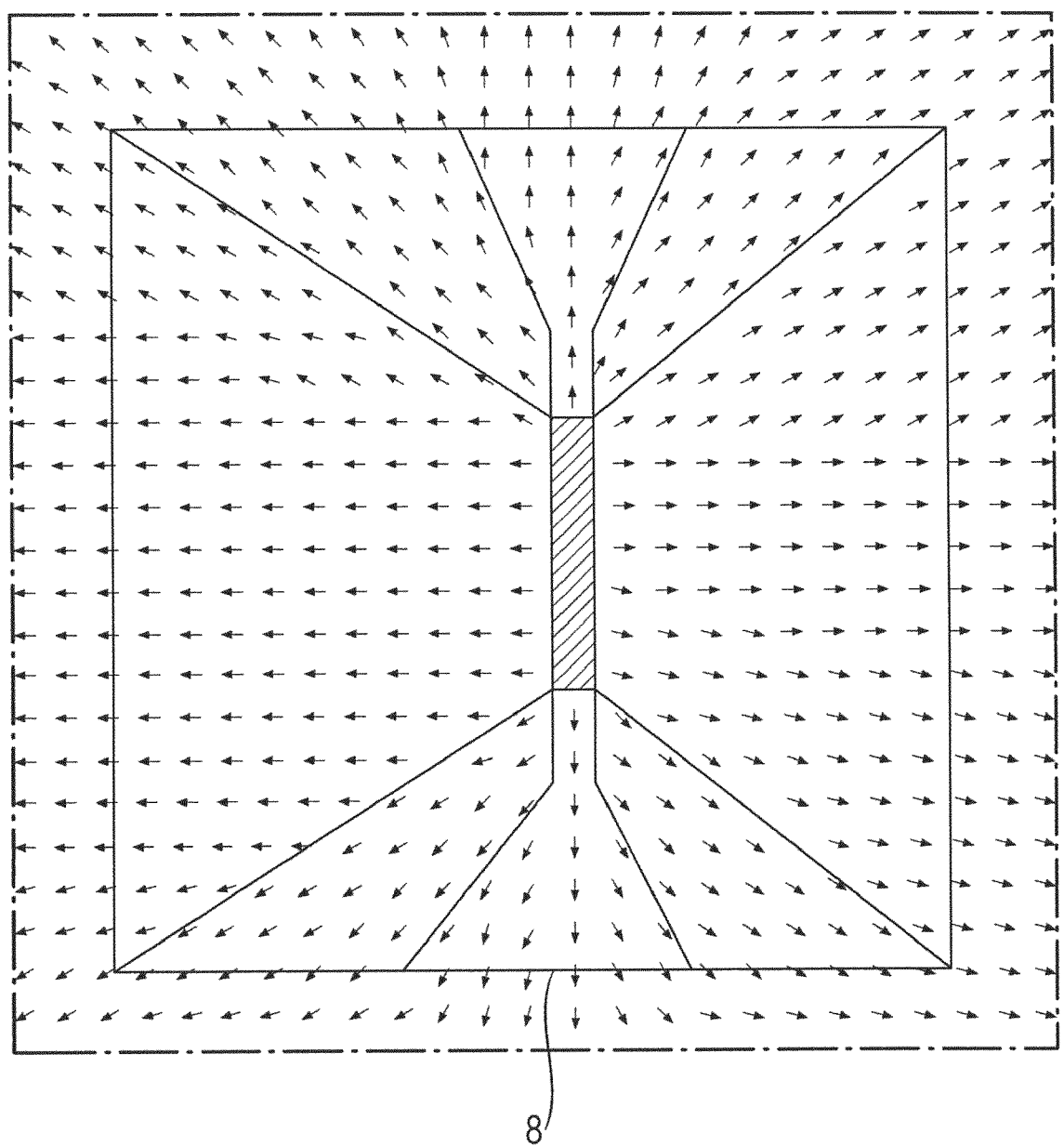
FIG. 3 shows in a plan view of the build area an example of a segmentation of the build area for a radial flow distribution.

FIG. 3 shows a plan view of a build area 8 with a flow distribution similar to that shown in FIG. 2e. As an example, the build area is divided into nine sub-areas depending on a distribution of the flow directions above the build area. Above the central, hatched sub-areas, the flow is essentially vertical, for example at an angle of 80° to 90° to the build area. This means that the vertical directions (e.g. at an angle between 45° and 90° relative to the build area) in the flow distribution within the flow segment formed on the hatched field outweigh the horizontal directions (e.g. at an angle less than 45° relative to the build area). A ratio between partial flows with predominantly vertical directions and partial flows with predominantly horizontal directions can be determined by their respective volume flows. Thus, a distribution of flow directions can be weighted by taking into account corresponding volume flow values and thus be interpreted.

For a jet which essentially impinges vertically on the build area, it is also important at which height above the build area the distribution of the flow directions is determined. It may happen that a determination of flow vectors at a height of 10 cm above the build area shows an emphasis on vertical components and at a height of 1 cm above the build area an emphasis on horizontal components. The reason for this lies in the phenomenon that gas which impinges essentially vertically on the build area frequently flows off essentially horizontally and that a zone of flow off has a relatively flat height extension.

The direction of flow essentially determines the direction of movement of residues created during the powder solidification and can therefore be considered a more important criterion for setting the direction of solidification than the essentially vertical gas flow before its deflection. In this example, no reference flow direction is assigned to the hatched area. When arranging the object(s) to be produced on the build area, i.e. in x/y direction, it can be avoided that a solidification segment falls into this area of the build area or overlaps with it. Alternatively, solidification can be carried out in any direction in this area. In the remaining eight sub-areas, the flow is essentially horizontal, and the flow directions determined in a plane parallel to the build area at a distance from the build area are each within a limited divergence range. Here, a reference flow direction can be assigned to each of the eight partial areas, as described below.

While the division of the build area into sub-areas is described above as being independent of the objects, it can also be carried out in dependence on the location of the objects to be produced on the build area or on the x/y level.

FIG. 4 shows a plan view of a build area 8 in which the cross-sections of a plurality of objects 2 to be produced are arranged. The division into sub-areas which are shown dashed in the figure occurs in such a way that a sub-area is assigned to each object 2, for example a rectangle or a geometric figure adapted to an exposure pattern in the form of a stripe or a chess board, which surrounds it. Here, boundaries between subareas can be drawn, for example, depending on the working areas of different solidification or laser beams, if it is a manufacturing device with several solidification beams. In FIG. 4a the flow distribution is not considered, in FIG. 4b it is included. There the mean flow direction is represented by an arrow and the divergence range of the flow by two lines arranged at an angle to this arrow.

Several segmentation models may also be stored in advance in a database, which can be designed and used depending on pre-defined settings of a flow in the process chamber, e.g. direction, velocity and/or effective range of the flow. Each of the flow-dependent segmentation models may have several degrees of fineness, which can be selected depending on a quality requirement for the construction process. If a high object quality is desired, a fine segmentation can be selected, which may result in a lower production speed, for example because the solidification beam has to jump more frequently from one solidification segment to the next without solidifying. If a high speed is desired, a coarse segmentation may be chosen, which may result in a lower homogeneity of the cross section or the whole object. A degree of segmentation can also be set depending on a location on the object, e.g. coarser in an interior area or finer on a contour of the object to be produced. The results of an evaluation using an algorithm that analyzes an object geometry appropriately can also be taken into account.

The segmentation of the build area can also be dependent on the object geometry in a particular layer. For example, performing a segmentation or a selection of a segmentation model from the database can be carried out individually depending on certain, for example geometric criteria.

Furthermore, a variation of segmentation models or concretely of position, area and/or shape of a segment in directly consecutive layers may be performed. This allows, for example, to avoid or reduce the overlapping of boundary areas of adjacent solidification segments in the z-direction in order to achieve better defined object properties.

A cross-section to be exposed preferably contains as few sub-areas (solidification segments) as possible. For this purpose, the positioning of an object may be made dependent on the division into flow segments. The positioning of components on the build area may also be carried out depending on the flow gradient, i.e. depending on the change in direction of the flow, which may vary locally. For example, only components with a small cross-section may be arranged in areas with a large change in direction, and components with a large cross-section may be arranged in areas with a small change in direction, or areas with a large change in direction are omitted from the arrangement of objects at all.

Also when determining the reference flow direction, data for assigning a reference flow direction to an area or sub-area and/or for the division into sub-areas may also be stored in a database for a predetermined setting of a flow in the process chamber, preferably for a predetermined course of a gas flow and/or a predetermined effective range of the flow. Further preferably, these data may be used and/or modified and used for a current assignment of a reference flow direction to an area or sub-area and/or for dividing an area of the build area into sub-areas.

As already explained above with reference to the special flow distribution shown in FIG. 3, a component of a vector of a flow direction of the gas flow that is vertical relative to the build area can also be determined in general and taken into account when assigning a reference flow direction to an area or sub-area and/or when dividing into sub-areas, wherein preferably no reference flow direction is assigned to an area or sub-area if the flow direction(s) above the area or sub-area is/are essentially vertical (e.g. 80-90°) to the build area.

The control of the irradiation device for solidifying at least a part of the cross-section of the object to be manufactured (a solidification segment) is then carried out in dependence on a reference flow direction in an area above the solidification segment (in a flow segment). The scanning direction of the laser beam (the direction in which the laser beam scans the build area or in which the point of impact of the laser beam moves across the build area) is selected in dependence on the reference flow direction in such a way that the angle between the two directions satisfies a predetermined angular relationship.

FIG. 5 shows a plan view of the build area with a coordinate system. The reference flow direction RR here runs in the positive x-direction. Furthermore different vectors of the scanning by the laser beam with different scanning directions RL are shown. These scanning vectors RL each form an angle $\gamma$ with the positive x-axis, i.e. with the reference flow direction RR, in the mathematically positive sense, which can range from 0° to 360° (0°≤γ≤°). Very good results can be achieved if the scanning vector RL and the reference flow direction RR form an angle $\gamma$ between 90° and 270° (90°≤γ≤270°) in a plan view of the working plane. In this case the scanning vector RL has no component pointing into the reference flow direction RR.

But even at angles $\gamma$ smaller than 90° or larger than 270°, where the scanning vector RL has a component pointing in the reference flow direction RR, good results can still be achieved as long as the component perpendicular to the scanning direction RL is large enough to keep splashes, fumes and vapors away from the laser beam. The preferred working range (scanning vectors shown as solid lines) lies between the two limit angles $\gamma1$ and $\gamma2$ (γ1≤γ≤γ2). Scan directions RL between 0° and $\gamma1$ or between $\gamma2$ and 360° (scanning vectors shown as dashed lines) should be avoided. The limit angles depend on the type of powder used, the laser power, the gas flow velocity and other operating parameters of the device. In general, a sufficient improvement of the object quality can be achieved if the angle $\gamma$ between the scanning vector RL and the reference flow direction RR in a plan view of the build area is between 22.5° and 337.5° (22.5°≤γ≤337.5°). Preferably, a range between 45° and 315° (45°≤γ≤315°) is selected, more preferably between 60° and 300° (60°≤γ≤300°), still more preferably between 90° and 270° (90°≤γ≤270°). FIG. 5 shows as an example a case where the limit angles $\gamma1$ and $\gamma2$ are selected to be $\gamma1=45°$ and $\gamma2=315°$.

The divergence angle can also be taken into account when defining the predetermined angular relationship. FIG. 5 schematically shows the deviation of the flow directions in the considered sub-area from the reference flow direction RR by two lines, which form an angle of $\delta1$ or $\delta2$ with the reference flow direction RR. In this case, the divergence angle is $\delta=\delta1+\delta2$. These angles must be added to or subtracted from the above values. For example, if the divergence angle is 30° and $\delta1=\delta2=15°$, the preferred range for the angle $\gamma$ between the sampling vector RL and the reference flow direction RR in the plan view of the build area is 37.5° to 322.5° instead of 22.5° to 337.5°. If the sampling vector RL is not to have a component pointing in the reference flow direction RR, the angle $\gamma$ must be between 105° and 255° instead of between 90° and 270°.

A second embodiment of the present invention differs from the first embodiment in that a specific exposure pattern is used. The area to be exposed in one layer, corresponding to the cross-section of the object to be produced, is divided into elongated stripes S, which run parallel to each other and are exposed one after the other.

FIGS. 6a and 6b show two different variations in the exposure of a stripe S in a plan view of the build area. In both cases, the exposure within each stripe S is carried out in parallel vectors V, which are essentially perpendicular to the longitudinal direction of the stripe. When the stripe S is exposed, the area solidified by the laser progresses in a feed direction RV, i.e. in a direction in which the individual vectors V are exposed one after the other.

FIG. 6a shows a curve in which an impact point P of the laser beam is guided across a section of the build area. The scanning directions RL of two adjacent vectors V are opposite to each other. The turning areas U (shown in dashed lines in FIG. 6a) lie outside the area to be exposed of the stripe S. The laser beam is switched off or blanked in these areas, or scanning by the laser beam is performed at these positions with an increased speed which is high enough that the energy insertion by the laser beam is not sufficient to solidify the powdery build-up material.

FIG. 6b also shows a curve in which an impact point P of the laser beam is guided across a section of the build area. However, all the vectors V have the same scanning direction RL. After turning on one side of the stripe S, the laser beam remains switched off or blanked until it has reached the opposite side of the stripe S again and has been turned again.

Figure 7:
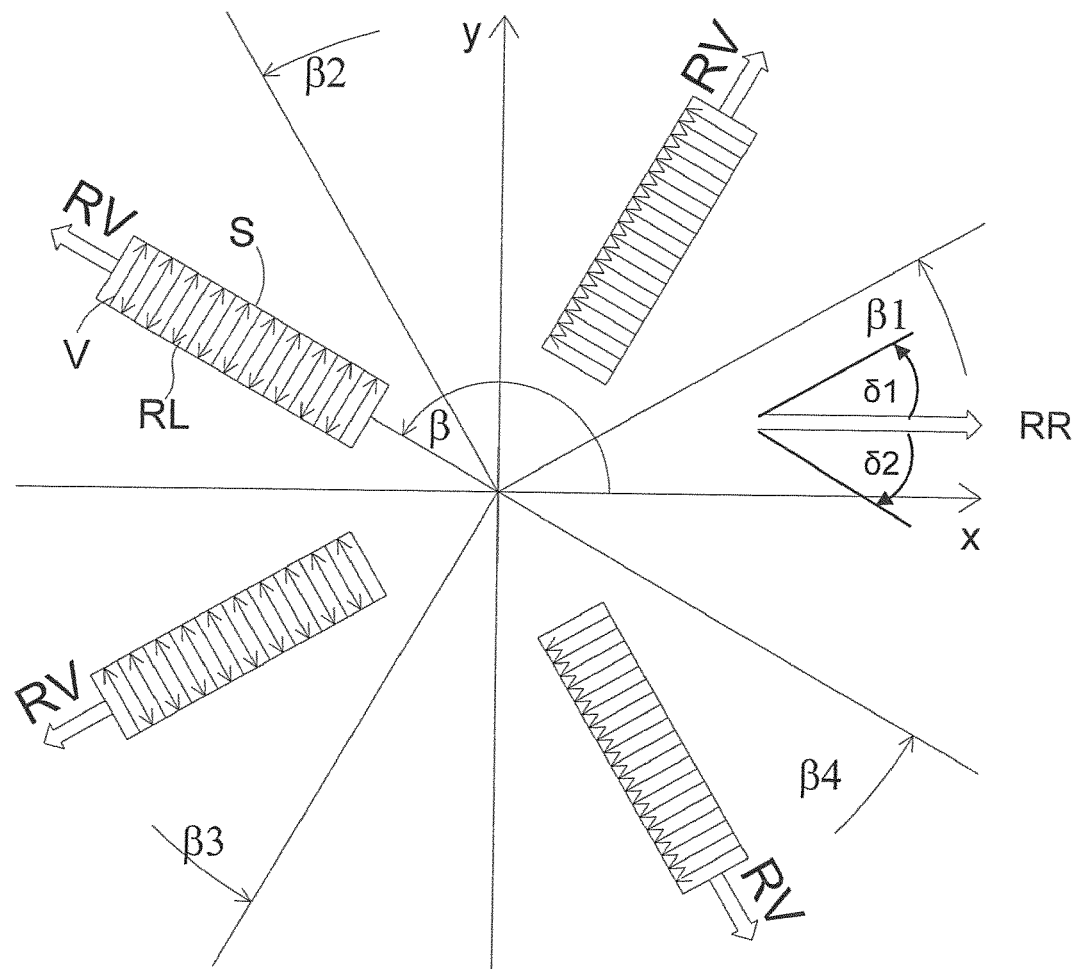
FIG. 7 shows a plan view of the build area to illustrate an exposure method according to the second embodiment.

FIG. 7 is a schematic top view of the build area to illustrate the exposure according to the second embodiment. The reference flow direction RR of the gas flow 20 defined for the area of the build area runs into the positive x-direction of the coordinate system. Furthermore single stripes S with the vectors V comprised therein are shown as examples for different feed directions RV. These feed directions RV in each case form in the mathematically positive sense an angle $\beta$ with the positive x-axis, i.e. with the reference flow direction RR, which can range from 0 to 360° (0°≤β≤360°). In this case, there are four limit angles that fulfill the relationship $\beta1<\beta2<\beta3<\beta4$, wherein the ranges between 0° and $\beta1$ and between $\beta4$ and 360° should be avoided.

The optimum working range lies between the two limit angles $\beta2$ and $\beta3$ (β2≤β≤β3). To ensure that the angle $\gamma$ between the scanning directions RL of the individual vectors V and the reference flow direction RR is always within the ranges indicated for the first embodiment, the angle β is selected so that it lies in a range between 112.5° and 247.5° (112.5°≤β≤247.5°), preferably between 135° and 225° (135°≤β≤225°), more preferably between 150° and 210° (150°≤β≤210°). Within this range, the exposure of the individual stripes can be carried out as shown in FIG. 6a.

The two ranges between limit angles β1 and β2 ((β1≤β≤β2) and between limit angles β3 and β4 (β3≤β≤β4) are also well suited. To ensure that the angle γ between the scanning directions RL of the individual vectors V and the reference flow direction RR is always within the ranges specified for the first embodiment, the exposure of the individual stripes in this case is carried out as shown in FIG. 6b. The same scanning direction RL for all vectors V is selected so that it has a component in the negative X-direction, or in other words that the angle γ between the scanning directions RL of the individual vectors V and the reference flow direction RR is between 90° and 270°. This type of exposure can of course also be applied in the range between β2 and β3. However, since the type of exposure shown in FIG. 6a is more efficient, it is preferred in the range between β2 and β3.

For the two limit angles β1 and β4, the same values apply as those given in the first version for γ1 and γ2, i.e. 22.5°, preferably 45° and more preferably 60° for β1 and 337.5°, preferably 315° and more preferably 300° for β4.

The divergence angle can also be taken into account here. In FIG. 7, as in FIG. 5, the deviation of the flow directions in the subrange under consideration from the reference flow direction RR is schematically represented by two lines. For example, if the divergence angle is 30° and δ1=δ=15°, the optimum working range in which the exposure pattern used according to FIG. 6a can be lies between 127.5° and 232.5° instead of between 112.5° and 247.5°. The working range in which the exposure pattern according to FIG. 6b can be used is between 37.5° and 300° instead of between 22.5° and 337.5°.

The exposure patterns for the various areas described above ensure that both the angles γ between the scanning directions RL of the individual vectors V and the reference flow direction RR and the angles β between the feed directions RV and the reference flow direction RR lie within the angular ranges specified for the first embodiment.

Instead of dividing the cross-section into elongated stripes S running parallel to each other, it can also be divided into squares, diamonds or other geometric shapes which are exposed one after the other.

Two concrete realization examples are described below.

The first example concerns a procedure for dividing a build area site into sub-areas, each of which is assigned a single reference flow direction. This procedure includes, for example, the following steps: A flow distribution from a computer-generated simulation of the course of a gas flow is used as the data basis. Of the entire space of a process chamber above the build area, only one plane parallel to the build area which has a distance of e.g. 1 cm to the build area is examined. The flow distribution has a uniform resolution and assigns a flow direction in the plane or in the x/y direction to square areas (hereinafter referred to as measuring areas) in the plane with a side length of e.g. 2 cm. This means that a surface corresponding to a square build area with a side length of 20 cm, for example, is assigned a total of 100 flow direction specifications in a measuring area grid.

In this example, the build area and the sum of the measuring areas (called the total measuring area in the following) have an identical area value. In other words, the contour of the measuring grid corresponds to an orthogonal projection of the build area on a plane 1 cm above the build area. The flow directions can also be extracted horizontal components of three-dimensional flow vectors. In the example described here, the flow directions are each additionally assigned, e.g. in a linked table, a volume flow value which was also determined in a simulation. The corresponding data may, for example, be provided in a two-channel image.

For evaluation, color values or gray values from a suitably resolving color or gray value scale are then assigned to the flow direction data. An angular value of a flow direction relative to the extension of the build area or to one side of the build area, e.g. 78.3°, is thus converted into an individual color value or grayscale value or linked to it. Each of the in the present case 100 two-dimensional flow direction data is coded in this way.

In the next step, the color values or grayscale values of the measuring areas are categorized according to the criterion of a reference flow direction and a related divergence angle of the flow directions. The categorization can be carried out either for the total measuring area or for an area of the total measuring area that corresponds to a cross-section of an object positioned on the build area. According to the method selected here, the determined color values or grayscale values are categorized into color areas or groups of color areas/grayscale areas. This categorization is based on a previously defined maximum divergence angle. The divergence angle can be valid for a build process of an object or for a layer and can be defined spatially either for a total measuring area or selectively for certain areas of the total measuring area up to individual measuring areas. An evaluation of this categorization can be performed, for example, using a histogram.

On this basis, the measuring areas of the same category are then assigned to each other or, if necessary, combined with each other. As a result, it is visualized which areas of the total measuring area or of a represented object cross-section meet certain conditions, namely firstly with regard to a flow direction in a measuring area, secondly with regard to a divergence angle, i.e. a spectrum of permitted deviations from the respective reference flow direction. For example, 12 of the 100 measuring areas may fulfil the condition that the flow directions determined for them lie within an angle range of 45° to 60°, which corresponds to a defined divergence angle of 15°. In addition, due to the dynamics of a gas flow, a bilateral tolerance range of a flow deviation of e.g. 7.5° is added, so that a total angle range of 30° is calculated. The areas formed in this way within the total measuring area or the component cross-section represented therein are referred to here as flow segments.

Optionally, the volume flow values present in the second channel may be correlated with this evaluation. For example, the measuring areas with a volume flow value below a given threshold value may be excluded from the formation of a certain flow segment and, for example, be added to an adjacent flow segment. This may result in a reduction of the number of flow segments without significant disadvantages.

In the following, solidification segments are formed on the basis of the generated flow segments, i.e. the build area or a cross-section is divided into virtual areas/subareas that determine an exposure strategy. Since the geometry of the flow segments may be irregular, it may be disadvantageous to transfer their shape unchanged to the solidification segments. Therefore, in the next process step, contours are smoothed and/or the individual surfaces or surface aggregations are transformed into polygons in such a way that a later exposure is prepared or facilitated with regard to a preferably homogeneous and easily controllable energy insertion.

Thereafter, exposure stripes or exposure stripe fragments are assigned to the solidification segments formed in dependence on angle ranges relative to the respective reference flow, as explained in the description of FIGS. 5 to 7.

The second example relates to an exposure procedure. The exemplary exposure method described below is not necessarily based on the first example of the formation of flow and solidification segments described above. As a condition a standard exposure by means of adjacent stripes with fixed stripe width is assumed. Each exposure stripe contains alternating scan lines (hatches) which are perpendicular to the orientation of the exposure stripe. This form of exposure typically ensures a relatively high solidification speed with a well controllable insertion of energy. In the first step, an angle relative to the build area or to one side of the build area is specified in which a pattern of exposure stripes is virtually oriented to the build area or to a cross-section to be exposed. Thereafter, it is checked whether and where in the areas of a layer to be exposed a defined fan of flow directions (the respective reference flow direction with the assigned divergence angle) is in an angular relationship to the orientation of the hatches that corresponds to the previously defined permissible angle ranges.

Where the above conditions are met, an exposure is provided with the stripe pattern aligned at the given angle. Where the above conditions are not met, exposure is for example provided with an alignment of the exposure stripes rotated by 90°. This creates a kind of herringbone pattern of solidification traces across the cross-section exposed in one layer. For example, the exposure stripes aligned at right angles to each other may be assigned to different solidification or laser beams, if the system has a plurality of solidification beams that can simultaneously be activated.

As an alternative, another angle may be selected within the rotation-free area determined before for aligning the exposure stripes or another exposure pattern. However, a solidification using exposure stripes arranged in an angle of 90° to each other and directly adjacent to each other offers as an advantage a considerable better controllability of the insertion of energy per area unit with a simple realization.

In addition to the exposure types described above, further exposure strategies may be used, for example others among those indicated in DE 10 2013 205 724 A1 cited above. For example, the scanning direction and or the feed direction of the stripes may be rotated from layer to layer by a predetermined angle. Therein, the reference flow determined according to the present invention replaces the main flow direction cited therein, and the adaptation of the scanning direction of the laser beam to the reference flow direction is carried out in the same way as described there with regard to the main flow direction.

Irrespective of the selected exposure strategy, a problem may occur in practice in the size and position of object's cross-sections in relation to the position of boundaries of the flow segments formed. Preferably, a cross-section of an object to be manufactured is exposed in a single orientation of the (alternating) exposure lines or vectors, because a change in orientation increases the risk of worse component properties due to inhomogeneity of the energy insertion due to the fact that exposure strips are oblique to each other. Therefore, the positioning of components depending on the position of flow segments is preferably done in such a way that a virtual overlapping of the cross-sections and the flow segment boundaries formed in the software is avoided. In addition or alternatively, a certain exposure direction (e.g. the alignment of the vectors) can be adopted for an entire cross-section, although the cross-section intersects one or more flow segment boundaries. However, this only is done under specific conditions (e.g. degree of a change in the flow direction in the adjacent flow segment or in an adjacent part of the flow segment; ratio between the area of the cross-sectional section in question and the area of the entire object's cross-section is below a defined threshold value, etc.).

With relatively small cross-sections, the probability that cross-sections and flow segment boundaries will be intersected is relatively low. Therefore, individual cross-sections can often be solidified taking into account a single reference flow direction or with a single orientation of the exposure vectors per layer. The term "orientation" does not mean the target direction of the solidification track, but the position of a solidification track relative to the extension of the build area or a layer. A repositioning of a component on the build area, i.e. in the x/y plane, to avoid cutting flow segment boundaries is often easy to achieve for relatively small cross-sections.

With relatively large cross-sections, the probability of intersections of cross-sections and flow segment boundaries is relatively high, so that individual cross-sections often cannot be solidified taking into account a single reference flow direction or with a single alignment of the vectors per layer. Re-positioning a component in the x/y plane to avoid cutting flow segment boundaries is often difficult for relatively large cross-sections.

For possible border cases, for example if parts of a cross-section of approximately the same size lie in adjacent flow segments or if a cross-section lies in three or more flow segments, programming the control unit should provide differentiated solutions.

According to an implementation of the invention, a coordination between the scanning direction of the laser beam and the reference flow direction does not necessarily have to be carried out across the entire solidification segment, but may also only be carried out at those points where the quality requirements are particularly high. In other areas, e.g. where a high build-up speed is more important than the specific mechanical properties of a workpiece, this adjustment can be omitted.

Although the present invention has been described with reference to a laser sintering or laser melting device, it is not restricted to laser sintering or laser melting. It may be applied to any method for the additive manufacturing of a three-dimensional object by applying and selectively solidifying a building material layer-by-layer.

The irradiation device may comprise for example one or more gas or solid state lasers or any other type of laser such as laser diodes, especially VCSEL (Vertical Cavity Surface Emitting Laser) or VECSEL (Vertical External Cavity Surface Emitting Laser), or an array of those lasers. In general, any device by which energy in form of wave or particle radiation can be selectively applied onto a layer of the building material may be used as an irradiation device. Instead of a laser, another light source, an electron beam or any other energy or radiation source which is suitable for solidifying the building material may be used, for example. Instead of the deflection of a beam, irradiation by means of a moveable row irradiator may be used. The invention may also be applied to selective mask sintering, in which a mask and an extended light source are used, or to high-speed sintering (HSS) wherein a material that increases (absorption sintering) or reduces (inhibition sintering) the absorption of the radiation at the corresponding positions may selectively be applied onto the building material, whereupon irradiation is unselectively carried out by a large-area irradiation or by means of a moveable row irradiator.

Instead of the introduction of energy, the selective solidification of the applied building material can, for example, also be achieved by other methods such as 3D printing, for example by means of the application of an adhesive. In this example, the solidification direction would be the direction in which the adhesive is applied to the powder surface. In general, the invention relates to the additive manufacturing of an object by means of a layer-by-layer application and selective solidification of a building material not depending on the manner in which the building material is solidified.

Various types of powder may be used as the building material, in particular metal powders, plastic powders, ceramic powders, sand, filled or mixed powders. Therein, powder may also be provided in the form of a suspension. Instead of powder, other suitable materials may also be used as a building material.

An inert gas, e.g. argon or nitrogen, is preferably used as the gas for the gas flow. However, the invention may also be applied if a process gas is used instead of an inert gas which reacts with the materials involved in the process, e.g. for reactive deposition of the powder material.

The invention claimed is:

1. A control method for controlling at least one solidification device of an additive manufacturing device for manufacturing a three-dimensional object by an additive layer build method in which at least one object is manufactured by repeated application of a layer of a building material to a build area and by selective solidification of the applied layer at positions corresponding to a cross-section of the object to be manufactured, wherein a gas having a plurality of flow directions which essentially are not aligned in a same direction flows across the build area, wherein the method comprises for at least one layer to be solidified the following steps:
    receiving and/or determining a distribution of the flow directions of the gas above the build area;
    assigning a reference flow direction to an area of the build area depending on the distribution of the flow directions above the area;
    controlling the solidification device to solidify at least a part of the cross-section of the object to be produced depending on a reference flow direction above the area of the build area in which a respective part of the cross-section is positioned;
    dividing at least one section of the build area into a plurality of sub-areas;
    for more than one of the sub-areas of the build area, assigning a reference flow direction to each one of the sub-areas; and
    controlling the solidification device depending on the respective reference flow direction above the respective sub-area.

2. The control method according to claim 1, wherein the division into sub-areas is performed depending on a divergence angle of the flow directions.

3. The control method according to claim 1, wherein the reference flow direction is an average flow direction of a number of the flow directions; and
    the division into sub-areas is performed in such a way that a deviation of the flow direction above the sub-area from the reference flow direction above the sub-area does not exceed a predetermined angle.

4. The control method according to claim 3, wherein the division into the sub-areas within a layer is performed locally selectively.

5. The control method according to claim 3, wherein the predetermined angle is at least 0°, and/or at most 60°.

6. The control method according to claim 1, wherein the division into sub-areas is performed layer-specifically depending on a geometry of a respective cross-section to be solidified of the object to be manufactured and/or on a ratio of area contents of an area to be solidified and of an area of the build area which is not to be solidified and/or on a degree of fragmentation of the area to be solidified within a respective layer.

7. The control method according to claim 1, wherein the step of assigning the reference flow direction is performed depending on a distribution of the flow directions in a flow segment above the area or the sub-area.

8. The control method according to claim 1, wherein the reference flow direction exclusively represents flow directions from the received or determined distribution which lie in a defined angular spectrum and/or exclusively represents flow directions which correlate with a respective partial gas flow, the volume flow value of which lies above a predefined threshold value.

9. The control method according to claim 1, wherein the step of controlling comprises defining a solidification direction for the area and/or sub-areas of the build area in which the cross-section of the object to be manufactured is positioned.

10. A manufacturing method for the additive manufacturing of a three-dimensional object by layerwise application and selective solidification of a building material, comprising the steps:
    applying a layer of the building material to a build area;
    selectively solidifying the applied layer of the building material at locations corresponding to a cross-section of the object to be manufactured by means of a solidifying device;
    repeating the steps of applying and solidifying until the three-dimensional object is finished;
    flowing across the build area a gas having a plurality of flow directions which essentially are not aligned in a same direction; and
    a control method according to claim 1 is used to perform the manufacturing method.

11. A storage medium on which a computer program is stored, the computer program being loadable into a programmable control unit and comprising program code means for executing all the steps of a control method according to claim 1 when the computer program is executed on the control unit.

12. A control device for a manufacturing device for the additive manufacturing of a three-dimensional object by layerwise application and selective solidification of a building material in a build area within a process chamber, wherein the manufacturing device comprises:
    a solidification device generating at least one beam of solidification energy that is directed onto the build area for selectively solidifying a layer of the building material applied to the build area at locations corresponding to a cross-section of the object to be manufactured; and
    a flow device comprising one or more inlets for supplying a gas to the process chamber and one or more outlets for discharging the gas from the process chamber, to thus generate a gas flow having a plurality of flow directions which essentially are not aligned in a same direction across the build area, wherein the control device is adapted to control the manufacturing device in such a way that the manufacturing device performs a control method according to claim 1.

13. A manufacturing device for the additive manufacturing of a three-dimensional object by layerwise application and selective solidification of a building material within a process chamber, comprising:

a solidification device generating at least one beam of solidification energy that is directed onto a build area for selectively solidifying a layer of the building material applied to the build area at locations corresponding to a cross-section of the object to be fabricated; and a flow device comprising one or more inlets for supplying a gas to the process chamber and one or more outlets for discharging the gas from the process chamber to thus generate a gas flow having a plurality of flow directions which essentially are not aligned in a same direction across the build area, wherein the manufacturing device is adapted and/or controlled to repeat the steps of applying and selectively solidifying until the object is completed; and wherein the manufacturing device comprises a control device according to claim 12.

14. The control method according to claim 1, wherein the building material is a powder.

15. The control method according to claim 1, wherein the sub-areas are selected adjacent to one another and/or overlapping one another and/or the division into sub-areas is performed depending on a geometry of the object to be manufactured in the respective layer and/or the division into sub-areas is performed depending on a distribution of the flow directions above the build area.

16. The control method according to claim 2, wherein the division into sub-areas is performed such that an area of the sub-area increases as the divergence angle decreases.

17. The control method according to claim 3, wherein the division into sub-areas within a layer is performed by limiting a deviation of the flow directions above the sub-areas from the respective reference flow direction above the sub-areas by different predetermined angles.

18. The control method according to claim 3, wherein the predetermined angle is at 1°, and/or at most 30°.

19. The control method according to claim 3, wherein the predetermined angle is at least 5° and/or at most 20°.

20. A control method for controlling at least one solidification device of an additive manufacturing device for manufacturing a three-dimensional object by an additive layer build method in which at least one object is manufactured by repeated application of a layer of a building material to a build area and by selective solidification of the applied layer at positions corresponding to a cross-section of the object to be manufactured, wherein a gas having a plurality of flow directions which essentially are not aligned in a same direction flows across the build area, wherein the method comprises for at least one layer to be solidified the following steps:

receiving and/or determining a distribution of the flow directions of the gas above the build area;

assigning a reference flow direction to an area of the build area depending on the distribution of the flow directions above the area; and controlling the solidification device to solidify at least a part of the cross-section of the object to be produced depending on a reference flow direction above the area of the build area in which a respective part of the cross-section is positioned, wherein the step of assigning the reference flow direction is performed depending on a distribution of the flow directions in a flow segment above the area or the sub-area; and wherein the flow segment is a two-dimensional area segment with a predetermined distance to the build area and/or a three-dimensional space.

21. A control method for controlling at least one solidification device of an additive manufacturing device for manufacturing a three-dimensional object by an additive layer build method in which at least one object is manufactured by repeated application of a layer of a building material to a build area and by selective solidification of the applied layer at positions corresponding to a cross-section of the object to be manufactured, wherein a gas having a plurality of flow directions which essentially are not aligned in a same direction flows across the build area, wherein the method comprises for at least one layer to be solidified the following steps:

receiving and/or determining a distribution of the flow directions of the gas above the build area;

assigning a reference flow direction to an area of the build area depending on the distribution of the flow directions above the area; and controlling the solidification device to solidify at least a part of the cross-section of the object to be produced depending on a reference flow direction above the area of the build area in which a respective part of the cross-section is positioned, wherein the step of controlling comprises defining a solidification direction for the area in which the cross-section of the object to be manufactured is positioned; and wherein an angle between the solidification direction and the reference flow direction is at least 22.5°, and/or at most 337.5°.

22. The control method according to claim 9, wherein an angle between the solidification direction and the reference flow direction is at least 45°, and/or at most 315°.

23. The control method according to claim 9, wherein an angle between the solidification direction and the reference flow direction is at least 60°, and/or at most 300°.

24. The control method according to claim 9, wherein an angle between the solidification direction and the reference flow direction is at least 90° and/or at most 270°.

25. A manufacturing method for the additive manufacturing of a three-dimensional object by layerwise application and selective solidification of a building material comprising the steps:

applying a layer of the building material to a build area;

selectively solidifying the applied layer of the building material at locations corresponding to a cross-section of the object to be manufactured by means of a solidifying device; and repeating the steps of applying and solidifying until the three-dimensional object is finished; and flowing across the build area a gas having a plurality of flow directions which essentially are not aligned in a same direction, wherein a control method according to claim 1 is used to perform the manufacturing method, only before a start of the selective solidification or a plurality of times during the additive manufacturing of the three-dimensional object and/or is performed depending on an adjustment and/or a change of the flow directions of the gas.

* * * * *